Patented Feb. 15, 1944

2,341,513

UNITED STATES PATENT OFFICE 2,341,513

PROCESS OF COATING METALLIC ARTICLES

Marcella R. Gilbert, Los Angeles, Calif.

No Drawing. Application August 16, 1940,
Serial No. 352,985

6 Claims. (Cl. 117—134)

My invention relates to a coating process for providing a protective coating on metals and has particular reference to a method of coating metals to prevent oxidation thereof and finding particular utility when applied to ferrous articles to prevent rusting.

The art of establishing protective coatings on metals to protect such metals from oxidation is very old and includes, among other processes, the method of applying organic compounds and esters of organic acids to the surfaces of the material.

The previous coating processes employing organic materials and the esters of the organic acids have, in general, been unsatisfactory due to the fact that the coating established was very brittle and cracked and checked, permitting ingress of moisture and oxygen to the material so treated. Furthermore, these coatings were, in general, not abrasive resistant to any very large extent, with the result that many parts of the metal which were subjected to abrasive wear soon lost their coating and consequently the protection afforded thereby.

It is accordingly an object of my invention to provide a method of establishing a durable protective coating on metals to retard and prevent oxidation of the metal so treated.

It is also an object of my invention to provide a process of coating metals with organic compounds to provide a protective coating thereon which is impervious to moisture and oxygen.

It is a further object of my invention to provide a process for coating the surface of metals to establish a uniform, durable and homogeneous protective coating thereon which protects the metal from oxidation in which the coating is derived from esters of the fatty acids.

It is also an object of my invention to provide a ready and inexpensive method of establishing protective coatings on metals by employing inexpensive esters of fatty acids which are by-products of food packing industries.

It is a further object of my invention to provide a method of coating the surface of metallic articles to prevent oxidation and deterioration of the article so treated in which raw beef suet is first applied to the metal and then the coated metal is heated.

Other objects and advantages of my invention will be apparent from a study of the following specifications, wherein is described in detail the preferred embodiment of my invention.

The ingredient which I use for establishing the protective coating on metallic articles is preferably raw suet, it being found that raw beef suet provides better and more durable coatings than do suets of other origin.

The suet is prepared before application to the article to be treated by grinding, crushing, mixing or masticating until a smooth, homogeneous, paste-like mass is obtained. This paste is then spread thinly and uniformly on the previously cleaned surface of the metallic article which is to be treated.

It has been found that better results are obtained if during the application of the suet to the article it is well worked so as to cause intimate contact between the suet and all parts of the article and to cause penetration of the suet into whatever pores occur in the surface of the article.

The article, together with its suet coating is then heated to a temperature between 200 and 500° F. and this temperature maintained for a sufficient length of time for all of the suet to melt and until the suet begins to carbonize. It has been found that excellent results are obtained by heating the article to a temperature of approximately 300° F. and maintaining the article at that temperature for a period of from fifteen to thirty minutes. As soon as the suet begins to show carbonization over the major portion of the article, the temperature is lowered and the excess melted suet and carbonized suet are removed by any suitable means, such as by wiping or brushing.

After the article has cooled to room temperature, it has been found that its appearance is substantially unchanged. The coating thus obtained is water-proof and oxygen-proof and acid resistant to a great degree. It appears also that there is some slight penetration of the treatment below the surface of the metal article so treated. The coating does not dull the finish of polished articles, such as chromium or nickel plating and in no way interferes with the adherence between paints or other finishes and the article.

While the preferred embodiment of my invention employs raw beef suet as the primary reagent, it is apparent that other acids and esters of the organic acids may also be used with advantageous results, such as oleic, linoleic or palmitic acid and various compounds or esters such as the glycerol esters of these acids. Furthermore, the application of the suet to the articles to be treated may be facilitated if the suet is dissolved or mixed with an organic solvent to provide a more fluid mixture which may then be sprayed or brushed on the article to be treated. It is my opinion, however, that better results are obtained if the suet is applied in the raw state and not mixed with any solvents, since the additional work required to apply the suet results in a more intimate contact of the suet with all parts of the surface to be treated.

One of the important features of my method of establishing protective coatings upon metallic articles lies in the application of the suet to the article while the suet is in the raw state and before it has been heated.

It has been found that if the suet is melted before application, the coating established upon the surface of the material is nothing more or less than a grease coating which is readily washed or worn away and the protection desired is not obtained.

The above described coating is intended primarily as a rust-proofing agent for use on ferrous articles such as those constructed from cast iron, wrought iron, cold rolled steel, high carbon steels and various iron and steel alloys such as manganese steel and the chromium and molybdenum alloys of iron. I have found by actual test, however, that the above described coatings will also prevent oxidation and tarnishing of metallic articles constructed from aluminum, nickel, silver, copper, tin, and chromium, and various alloys such as brass.

This application is a continuation-in-part of my copending application Serial No. 264,589, filed March 28, 1939.

While I have described the preferred embodiment of my invention, I do not desire to be limited to any of the details described, except as defined in the appended claims.

I claim:

1. A coating process for protecting articles constructed of metals of the group consisting of the ferrous metals and alloys thereof; nickel, silver, aluminum, copper, tin, chromium, and the alloys thereof; and which consists in applying to the surface of the article to be coated a layer of coating material of the group consisting of raw beef suet and the glycerol esters of oleic, linoleic or palmitic acid; and then heating the article to a temperature exceeding the melting point of said ester and maintaining said temperature for a time exceeding five minutes.

2. A coating process as defined by claim 1 in which the article is heated to a temperature at least as high as the carbonizing temperature of said coating material, and in which the temperature is maintained until carbonization of the material is general.

3. A coating process as defined by claim 1 in which the article is heated to a temperature of 200–500° F., and in which the temperature is maintained for a period of from 15 to 30 minutes.

4. A coating process as defined by claim 1 in which the article is coated with a layer of material consisting principally of raw beef suet.

5. A coating process for protecting articles constructed of metals of the group consisting of the ferrous metals and alloys thereof; nickel, silver, aluminum, copper, tin, chromium, and the alloys thereof; and which consists in applying to the surface of the article to be coated a layer consisting solely of raw beef suet; and then heating the article to a temperature of from 200 to 500° F. and maintaining said temperature from 15 to 30 minutes.

6. A coating process as defined by claim 5 in which the raw beef suet is thoroughly masticated prior to application to the article to produce a thin pastelike mass which is then spread uniformly over the article and well worked in.

MARCELLA R. GILBERT.